United States Patent [19]

Butler

[11] 4,249,178
[45] Feb. 3, 1981

[54] APPARATUS FOR ELIMINATING BLIND VELOCITIES IN MTI RADARS

[75] Inventor: Walker Butler, Scottsdale, Ariz.

[73] Assignee: Motorola Inc., Schaumburg, Ill.

[21] Appl. No.: 84,262

[22] Filed: Oct. 12, 1979

[51] Int. Cl.³ .............................................. G01S 13/52
[52] U.S. Cl. .................................................... 343/7.7
[58] Field of Search ........................................ 343/7.7

[56] References Cited

U.S. PATENT DOCUMENTS

| 3,129,423 | 4/1964 | Mortley | 343/7.7 |
| 3,267,468 | 8/1966 | Stull, Jr. | 343/7.7 |

*Primary Examiner*—T. H. Tubbesing
*Attorney, Agent, or Firm*—M. David Shapiro; Eugene A. Parsons

[57] ABSTRACT

A system and method for reducing the blind velocity problems in MTI coherent pulsed Doppler radar systems comprising an agile local oscillator which is preprogrammed to operate sequentially at more than one frequency unitl a target of interest is acquired.

2 Claims, 7 Drawing Figures

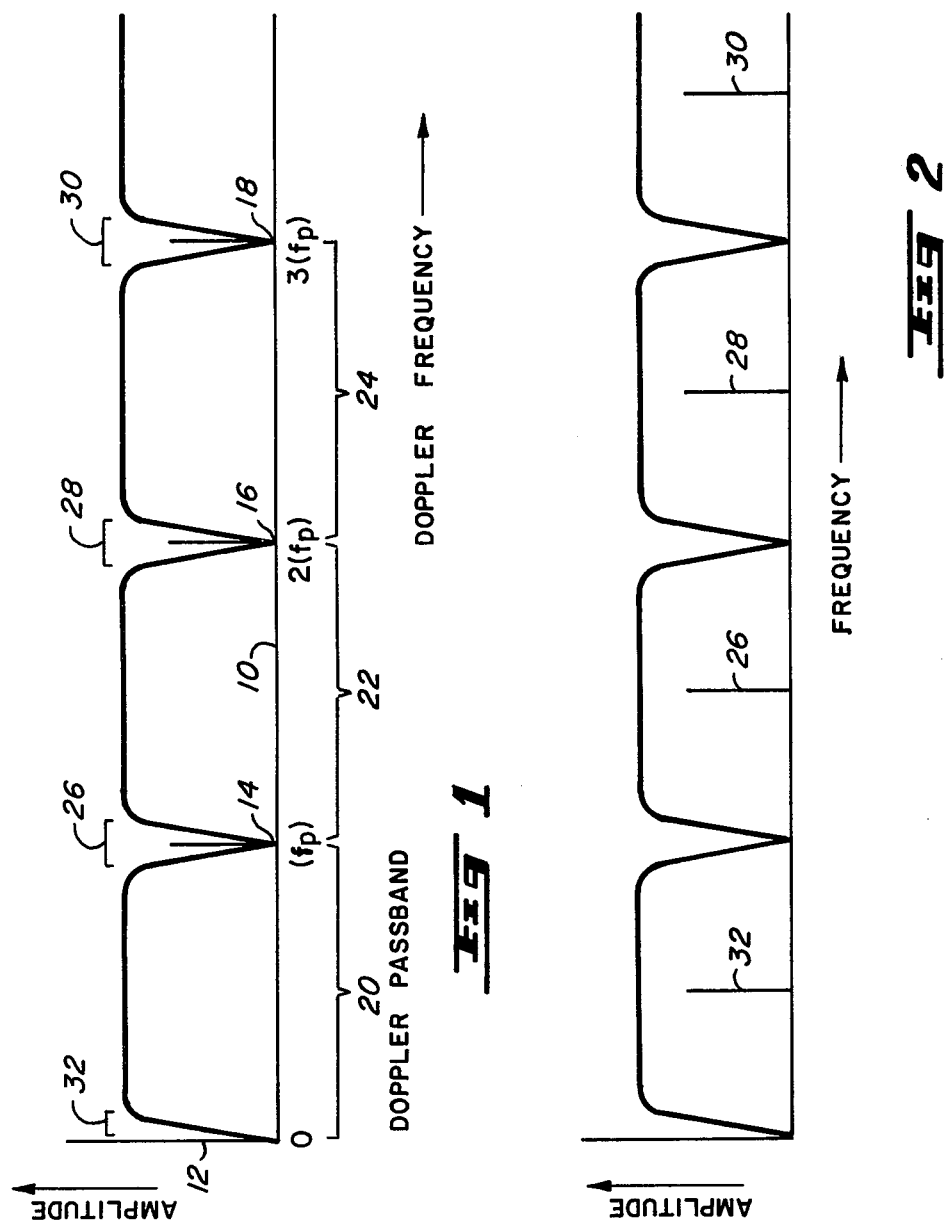

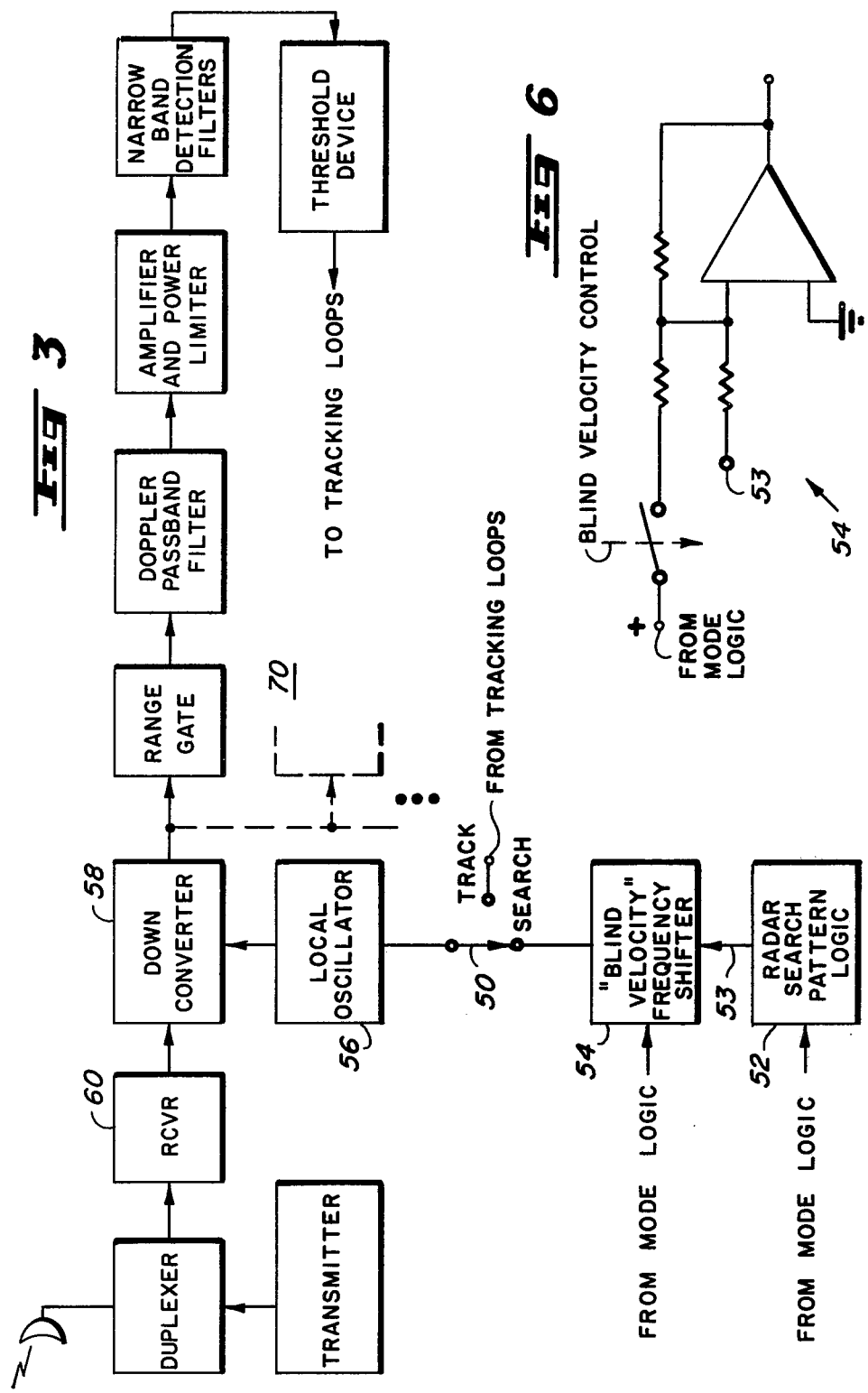

APPARATUS FOR ELIMINATING BLIND VELOCITIES IN MTI RADARS

FIELD OF THE INVENTION

The invention relates to a system for improving radar response to blind velocities such as those corresponding to integral multiples of the pulse repetition frequency of the radar and to those moving targets crossing the radar beam.

BACKGROUND OF THE INVENTION

Blind velocities exist in coherent pulsed Doppler radars at velocities where the target is not detected due to the fact that its Doppler return frequency occurs at a point in the spectrum where, for example, rejection filters exist in the radar processor. For example, a crossing target has no Doppler component in its return signal, that is, it looks like a stationary target. In this case, the return frequency would be at the transmitter spillover frequency, where there generally exists a filter. Multiples of these blind velocities occur at the PRF frequency multiples, following the Doppler principle that Doppler frequency, $f_d$, is:

$$f_d = 2V/\lambda$$

where:

V equals closing or opening velocity between radar and target or clutter, and $\lambda$ equals wavelength of carrier frequency.

Thus, for example, a 1 kilohertz PRF radar, operating at X band will have blind velocities at approximately every 15 to 20 miles per hour of closing velocity. If a target were in a crossing pattern, or were incoming or outgoing at one of the blind velocities, it would not be detected by the radar system. It is known in the prior art to change the pulse repetition frequency during the operation of the radar in order to change the blind velocities. However, changing the PRF does not alleviate the masking of crossing targets. For example U.S. Pat. Nos. numbered 3,480,953; 3,858,208; and 3,491,360 are representative of such prior art. FIG. 1 is illustrative of the problem.

It is also well known in the art to tune the local oscillator of a radar receiver in order to track varying Doppler frequencies which result from changes in velocity of a tracked target. Furthermore, it is well known in the art to change the local oscillator frequency of any superheterodyne receiver in order to tune the receiver to a particular incoming frequency, such as during the search process. In the first case, the difference frequency between the local oscillator frequency and the incoming frequency is always the same, that is, the intermediate frequency (IF) of the systems. In the second case, that is where the local oscillator frequency is changed in order to search for the target, the difference between the incoming frequency signal and the local oscillator is linearly a function of the target Doppler frequency.

SUMMARY OF THE INVENTION

The foregoing and other shortcomings and problems of the prior art are overcome, in accordance with the present invention, by utilizing a predetermined programmed shift in the local oscillator of a coherent pulsed MTI Doppler radar.

It is therefore an object of the invention to eliminate the blind velocity syndrome from a coherent MTI Doppler radar by means of an agile local oscillator.

It is another object of the invention to make detectable those targets which may be crossing the radar beam at a 90° angle by means of shifting the local oscillator frequency of the radar.

It is still another object of the invention to reposition targets which would normally fall without the Doppler passband of a radar by means of shifting the local oscillator frequency of that radar so as to cause the targets to be within the Doppler passband.

These and other objects of the invention will become more clearly understood upon reading of the Detailed Description of the Invention which follows together with drawings in which, FIG. 1 is a graphic representation of the moving target indicator passband spectrum (at base band) of a coherent MTI pulse Doppler radar, FIG. 2 is a graphic representation of the moving target indicator passband spectrum (at base band) of the radar of the invention with the local oscillator frequency shifted to put the "blind" targets in the passband, FIG. 3 is a detailed block diagram of an MTI radar acquisition channel for eliminating blind velocities, FIG. 4 is a detailed block diagram of a portion of FIG. 3, FIG. 5 is a typical search pattern waveform from the circuitry of FIG. 3, FIG. 6 is a detailed block diagram of another portion of FIG. 3, and FIG. 7 is a typical search pattern with and without blind velocity frequency shift of $f_p/2$.

DETAILED DESCRIPTION OF THE INVENTION

Figure 4:
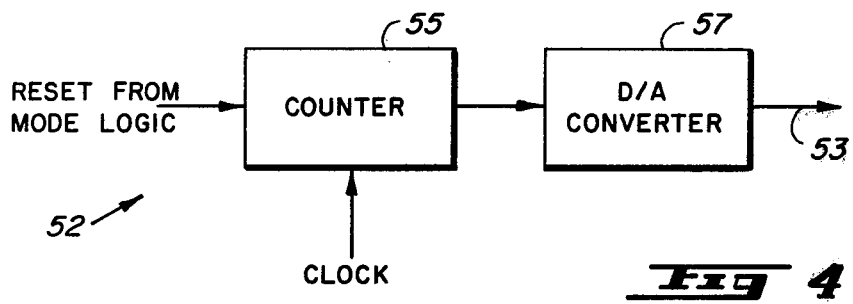

Referring first to FIG. 1, it may be seen that Doppler frequency is plotted along abscissa 10 and amplitude of response is plotted on ordinate 12. In a typical coherent pulsed Doppler MTI radar, blind velocities occur at multiples of the pulse repetition rate, $f_p$, as shown at 14, 16 and 18. The Doppler pass band occurs between these points as shown at 20, 22 and 24. Blind velocities 26, 28 and 30, resulting from targets which move either toward or away from the radar occur in areas between passbands 20, 22, 24. Blind targets due to crossing of the target with respect to the radar beam occur in area 32.

In FIG. 2, it may be seen that a target in area 32 (FIG. 1), the crossing target area, has been moved into the Doppler pass band at 32 (FIG. 2). Targets at blind velocities 26, 28 and 30 have similarly been moved into Doppler pass bands at 26, 28 and 30 in FIG. 2. This is accomplished by changing the local oscillator frequency in the receiver of the radar, by a known amount, to see if a target exists at these frequencies. This may be done on alternate search patterns, for instance, but in the preferred embodiment of the invention it is done on every third search pattern. In order for this technique to be feasible, the PRF lines and spillover must be low enough in amplitude such that they are not detected by the radar when they are moved into the pass band. In addition, the clutter, that is the signals from stationary radar returns, must either be low enough to not be detected by the radar or a clutter detection technique must be employed similar to the one described in U.S. Pat. No. 4,119,966. Given the above technique, it is possible to detect targets which would normally be in the blind zone of a radar.

FIG. 3 illustrates, in block diagram form, a radar system implementing a preferred embodiment of the invention herein described. SEARCH-TRACK switch 50 is energized to allow radar search pattern logic 52 to control or program the local oscillator frequency in a predetermined manner. When a target is acquired, the switch 50 automatically moves to the track position in order to allow the output signal from the tracking loops to control the local oscillator, thus tracking the target.

Figure 5:
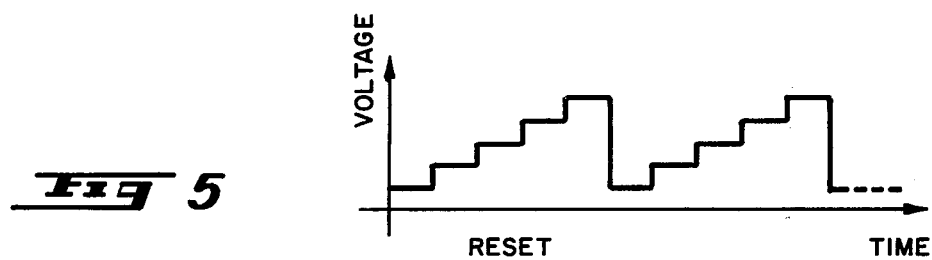

Radar search pattern logic 52 will typically consist of means for changing the control voltage on the local oscillator in order to periodically shift different portions of the spectrum down to baseband, in order to use the Doppler filters to examine, or "search", different velocity or range increments. If the local oscillator were programmed by this logic to change frequency by an amount equal to the PRF, $f_p$, for example, then complete sections of the Doppler passbands would be searched for targets. FIG. 4 presents a typical example of a logic circuit of this type. In this circuit a counter 55 is reset from the mode logic and periodically incremented by clock pulses. The output signal is converted to an analog signal, illustrated in FIG. 5, by a D/A converter 57. Each step illustrated in FIG. 5 represents a search and is produced by a single clock pulse. Logic circuit 52 controls, in turn, blink velocity frequency shifter 54 by way of lead 53.

Figure 7:
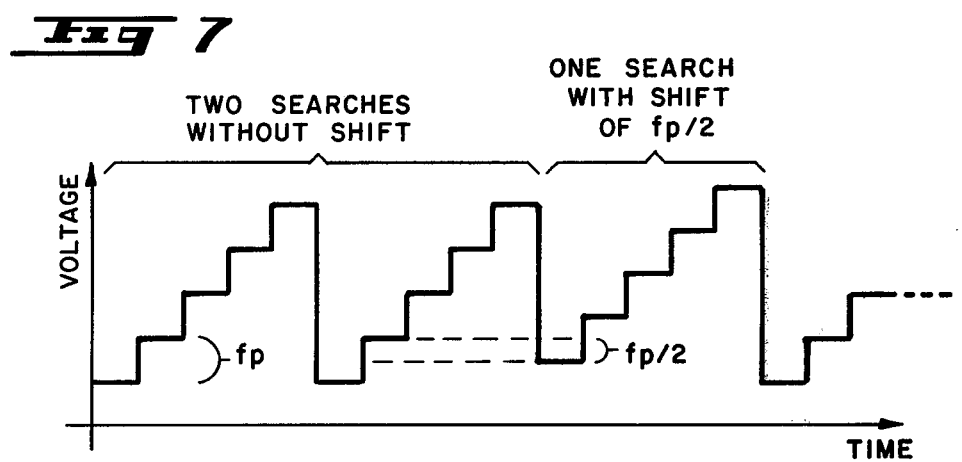

The blind velocity frequency shifter 54 will add a predetermined offset voltage to the radar search pattern logic output signal, in order to shift the blind velocities into the Doppler passband. The command to shift would typically come from the radar seeker mode logic, but manual means could be provided for switching this function also. FIG. 6 shows a typical circuit to be used for this frequency shifter and FIG. 7 illustrates a typical search pattern wherein the first two searches are without a shift and the third search is shifted by $f_p/2$.

Blind velocity frequency shifter 54 is utilized to control local oscillator 56 in the predetermined pattern of frequency shifts. The resulting signal from local oscillator 56 is mixed in down converter or mixer 58 with the incoming signal from receiver front end 60. Range gates 70 are then utilized to establish the range of a particular response from receiver 60.

Various other modifications and changes may be made to the present invention within the principles of the invention described above without departing from the spirit and scope thereof as encompassed in the accompanying claims.

What is claimed is:

1. A method of reducing a blind velocity problem in an MTI coherent pulsed Doppler radar system, comprising the steps of:
    searching first for a target utilizing a first local oscillator frequency which characteristically produces a first series of blind velocity responses;
    searching second for said target utilizing a second local oscillator frequency which characteristically produces a second series of blind velocity responses, said second series of blind velocity responses being of a different frequency characteristic than said first series of blind velocity responses; and
    alternating between said searching first step and said searching second step until a target is acquired.

2. In a pulsed Doppler MTI radar system, having a local oscillator and a mixer, an improvement comprising in combination:
    means for generating a programmable local oscillator frequency;
    logic means for programming a predetermined pattern of frequency outputs from said generating means; and
    means for coupling said logic means with said generating means for sequentially producing a series of at least two output frequencies from said producing means.

* * * * *